United States Patent [19]
Link

[11] Patent Number: 5,941,146
[45] Date of Patent: Aug. 24, 1999

[54] WORK SPINDLE

[75] Inventor: Helmut Friedrich Link, Aichwald, Germany

[73] Assignee: Index Werke GmbH & Co. KG Hahn & Tessky, Esslingen, Germany

[21] Appl. No.: 08/873,139

[22] Filed: Jun. 9, 1997

[30] Foreign Application Priority Data

Jun. 10, 1996 [DE] Germany ............................ 196 23 128

[51] Int. Cl.⁶ .................................................. B23B 13/00
[52] U.S. Cl. ................................ 82/147; 82/168; 82/169; 279/4.01
[58] Field of Search ............................... 82/147, 146, 142, 82/162, 168, 169, 50, 90, 101, 102; 408/226; 279/4.01

[56] References Cited

U.S. PATENT DOCUMENTS 4,672,869  6/1987  Hasslauer et al. ..................... 82/147 X

FOREIGN PATENT DOCUMENTS

| 0 404 697 | 12/1981 | European Pat. Off. . | |
| 348168 | 12/1989 | European Pat. Off. ............... | 279/4.01 |
| 1 477 232 | 3/1969 | Germany . | |
| 30 29 432 | 3/1982 | Germany . | |
| 37 34 589 | 8/1988 | Germany . | |
| 278 518 | 5/1990 | Germany . | |
| 293769 | 9/1991 | Germany ............................... | 279/4.01 |
| 42 40 959 | 6/1994 | Germany . | |
| 44 01 779 | 7/1995 | Germany . | |
| 184704 | 8/1991 | Japan ..................................... | 279/4.01 |
| 1392251 | 4/1988 | U.S.S.R. ............................... | 279/4.01 |
| 1399005 | 5/1988 | U.S.S.R. ............................... | 279/4.01 |
| 1400792 | 6/1988 | U.S.S.R. ............................... | 279/4.01 |

*Primary Examiner*—Andrea L. Pitts
*Assistant Examiner*—Henry W. H. Tsai
*Attorney, Agent, or Firm*—Barry R. Lipsitz; Ralph F. Hoppin

[57] ABSTRACT

A work spindle for a machine tool. The work spindle has a spindle guard tube, a clamping arrangement, a clamping force generator, which is arranged on the spindle guard tube and operates the clamping arrangement, and which has at least one first cylinder chamber enclosed by a first cylinder housing and a first piston, in such a way that a large band width of different clamping forces may be generated simply. The clamping force generator has a second cylinder chamber enclosed by a second cylinder housing and a second piston. Additionally, for operation of the clamping arrangement, both cylinder chambers are always subjected to a pressurized medium. Furthermore, to generate different clamping forces, the clamping force generator is switchable over from a first working mode, in which at least the first piston operates the clamping arrangement, into a second working mode, in which at least the second piston operates the clamping arrangement.

25 Claims, 3 Drawing Sheets

WORK SPINDLE

BACKGROUND OF THE INVENTION

The invention relates to a work spindle or operating spindle for a machine tool comprising a rotatably mounted spindle guard tube, which is drivable by a motor, a clamping arrangement disposed at an end of the spindle guard tube, a clamping force generator, which is arranged on the spindle guard tube and operates the clamping arrangement, and which has at least one first cylinder chamber enclosed by a first cylinder housing and a first piston, which in order to generate a clamping force in the clamping arrangement, is subjected to a pressurized medium, and a connection between the clamping force generator and the clamping arrangement.

Such work spindles are known from the prior art. The problem with such work spindles is that different clamping forces are necessary, depending upon the clamping task in the clamping arrangement.

Although it is possible, in principle, to vary the clamping forces by varying the pressure of the pressurized medium for generation of the clamping force, this pressure variation is subject to technical limits.

For this reason, the clamping force generator has often been replaced in its entirety in order to generate different clamping forces. However, such a replacement of a clamping force generator arranged on a work spindle is the equivalent of refitting the machine, since a plurality of peripheral components must be disassembled and re-assembled. This refit is particularly costly in the case of machine tools with several work spindles.

In the sense of the invention, the term work spindles may refer to spindles, wherein work pieces are to be clamped in their clamping arrangement, but it is also possible to use these spindles as tool spindles.

In particular when using tool spindles, it is frequently a requirement to clamp completely different work pieces in the case of flexible use of the machine tool. The range of work pieces extends from solid steel parts, in the case of which a high clamping force is also necessary because of the high machining forces, to thin-walled aluminium parts, in the case of which minimal clamping forces must be used—in order to prevent deformation.

SUMMARY OF THE INVENTION

Working from these known solutions, the object of the invention is to improve a work spindle of the above-mentioned type in such a way that a large band width or range of different clamping forces is capable of being generated with the simplest possible means.

This object is achieved according to the invention in the case of a work spindle of the type described above in that the clamping force generator has a second cylinder chamber enclosed by a second cylinder housing and a second piston; that for operation of the clamping arrangement, always both cylinder chambers are subjected to a pressurized medium; and that in order to generate different clamping forces, the clamping force generator is switchable over from a first working mode, in which the first piston operates the clamping arrangement, into a second working mode, in which the second piston operates the clamping arrangement.

Therefore, the advantage of the solution according to the invention is that a second piston is provided in a second cylinder housing with a second cylinder chamber, but that always both cylinder chambers are subjected to medium under the same pressure, i.e. may be fed via the same pressure connection, so that the supply of the clamping force generator according to the invention can be carried out in the same way as if this had only one piston in a first cylinder housing.

The switchover between the first working mode and the second working mode in the solution according to the invention is merely achieved by the first piston or the second piston being active in the first or second working mode.

Hence, with the exception of the necessary switchover, actuation and operation of the work spindle according to the invention is possible with respect to the connection of the pressurized medium just as if it had only a single clamping force generator with one piston.

In an embodiment of the solution according to the invention, a provision is to have both pistons active, either in the first or in the second working mode, in which case only one of the pistons can then be active in another of the working modes in order to obtain different clamping forces.

However, it is also possible within the scope of the solution according to the invention to respectively work with only one active piston both in the first working mode and in the second working mode, whereby this does not exclude a third working mode, in which both pistons are then active.

A particularly advantageous solution because of its simplicity provides that only the first piston is active in the first working mode, and only the second piston is active in the second working mode.

Various solutions are conceivable to achieve this. For example, it would be conceivable to make the connection between the first piston and the clamping arrangement or the connection between the second piston and the clamping arrangement switchable or reversible, so that although the respective inactive piston is movable by means of the pressurized medium, it does not exert any force on the clamping arrangement.

Another particularly favourable solution because of its simplicity provides that in the first working mode, the second piston is fixable relative to the second housing.

Alternatively or in addition thereto, however, it is also possible to provide that in the second working mode, the first piston is fixable relative to the first cylinder housing, thus assuring in the second working mode that only the second piston is active.

In all the embodiments in which only the first piston is active in the first working mode, and only the second piston is active in the second working mode, a provision is that a piston area of the one piston is larger than a piston area of the other piston, since only then will different piston areas be available for the generation of different clamping forces in the case of the pressurized medium.

Depending on the structure of the piston and the cylinder housing, and on the forces which may be generated thereby with the pressurized medium, however, it is also sufficient in some solutions to fix the second and the first piston respectively relative to the second and first cylinder housing respectively in the first working mode or only in the second working mode.

The solution according to the invention may also be achieved and operated in a particularly simple manner when a switchover occurs between the first and the second working mode only by changing the fixture of the pistons, so that no further measures are required for the switchover between the first and the second working mode.

Therefore, a switchover element is preferably provided for the switchover between the first and second working mode.

In principle, this switchover element could be operated by the control system of the machine tool with the respective work spindle.

However, it is particularly advantageous and reliable if the switchover element is manually operable, in which case firstly the control expenditure is dispensed with and secondly, when the clamping forces to be generated are dependent upon the clamping arrangement, it is particularly advantageous to combine the possibility of switching over with changes with respect to the clamping arrangement, which must still be carried out manually.

For this reason it is preferably provided that the switchover element is arranged to face the clamping arrangement, so that switchover can occur at the same time as the still necessary manual handling of the clamping arrangement.

Since the machine tool using the work spindle must still be constructed so as to permit simple manual handling in the region of the clamping arrangement, it is thus automatically assured that the switchover may also occur in a simple manner, and it is thus in particular assured that the other regions of the work spindle need not be arranged so as to be accessible for switchover.

It is particularly favourable in the solution according to the invention if the switchover element is arranged in the spindle guard tube so as to be accessible with respect to the clamping arrangement so that free accessibility to the switchover element is possible, for example, upon disassembly of the clamping arrangement.

No further details have be given with respect to the arrangement of the switchover element in association with the preceding explanation of the individual embodiments. For example, it has not been specified in particular where precisely the switchover element is active.

In particular when the switchover element is to be arranged so as to face the clamping arrangement, it is advantageously provided that the switchover element is active in the region of the connection between the clamping force generator and the clamping arrangement, and is preferably arranged on the latter.

The relative arrangement of the first piston and the second piston has not been explained in more detail within the preceding explanation of the individual embodiments. For example, it would be possible in principle to arrange the first and the second piston completely independently of one another.

However, since as compact a structure of the clamping force generator as possible is desired in the case of the work spindles, it is advantageously provided that the first cylinder housing of the first piston is formed by the second piston. This has the great advantage that—in particular since the two cylinder chambers are still subjected to medium under the same pressure—a particularly favourable and space-saving solution is available.

In the solution in which the first piston is arranged in the second piston, it is possible to achieve the equal-acting application of pressure on the first cylinder chamber and the second cylinder chamber on the basis that the first cylinder chamber of the first piston is constantly connected to the second cylinder chamber via a conduit in the second piston. This solution enables only the second cylinder chamber to be subjected to the pressurized medium from the outside, since when the second cylinder chamber is subjected to pressure, the first cylinder chamber will necessarily also be subjected to pressure through the conduit.

Only a first and a second cylinder chamber have been respectively referred to in conjunction with the solutions described so far, since in the simplest case only one respective cylinder chamber is necessary, in order to generate a clamping force acting on the clamping arrangement for clamping a work piece or a tool.

However, to also allow detachment of the clamping arrangement in an advantageous manner or to allow internal clamping to occur, it is preferably provided that each piston also has a rear-side cylinder chamber; and that the rear-side cylinder chambers are always connected to one another. This means that when the rear-side cylinder chambers are subjected to pressure, both pistons are also always subjected simultaneously to pressure in the same manner as when the first and second cylinder chambers are subjected to pressure.

In particular in the case of the above-described solution, in which the first piston is arranged in the second piston, a possible arrangement, for reasons of simplicity, is if the rear-side cylinder chambers of both pistons merge into one another, i.e. there is no separation between them whatsoever.

The connection between the clamping force generator and the clamping arrangement has not been discussed in detail in association with the preceding explanation of the individual embodiments and practical examples. The connection may be constructed in the form of any type of force transmission means. However, a particularly favourable solution provides that the connection between the clamping force generator and the clamping arrangement comprises a first piston rod of the first piston and a second piston rod of the second piston.

In particular when the first piston is arranged in the second piston, an advantageous solution provides that the first piston rod runs coaxially to the second piston rod constructed in the form of a tube.

No further details have hitherto been given with respect to the arrangement of the second cylinder housing. Hence, it is particularly advantageous if the spindle guard tube supports the second cylinder housing of the second piston. For a construction which is as compact as possible and is advantageous to the installation of work spindle, it is advantageously provided that the spindle guard tube supports the cylinder housing of the second piston at an end opposite the clamping arrangement.

To enable the switchover in the region of the connection between the clamping arrangement and the clamping force generator to be achieved in an advantageous manner, a particularly advantageous solution provides that in the first working mode, the second piston rod may be fixed relative to the spindle guard tube by means of the switchover element. Since the spindle guard tube supports the second cylinder housing, a fixture of the second piston relative to the second cylinder housing may thus be achieved in a simple manner.

In addition or alternatively thereto, it is provided that in the second working mode, the first piston rod is fixable relative to the second piston rod by means of the switchover element. In this case, it is also possible to achieve a fixture of the first piston relative to the first cylinder housing formed by the second piston in a simple manner.

In spite of the individual explanations concerning the relative fixture of the piston rod, there has as yet been no detailed explanation of where the switchover element itself is arranged. Hence, a particularly preferred embodiment provides that the switchover element is arranged on the second piston rod and is movable into various switchover positions fixed relative to the second piston rod, so that the switchover element acts in a different manner, depending on its switchover position.

Hence, it is preferably provided in one case that, in a first switchover position, the switchover element abuts against a shoulder fixedly arranged in relation to the spindle guard tube.

Alternatively or in addition thereto, it is provided that in a second switchover position, the switchover element abuts against a shoulder fixedly connected to the first piston rod.

The switchover element has thus far not been more closely defined, nor has the capability of the switchover element to be fixed relative to the second piston rod been explained in more detail.

Hence, it is conceivable, for example, to position the switchover element in the individual switchover positions by means of any type of non-positive or positive connections on the second piston rod.

However, it has proved to be particularly simple and advantageous if the switchover element is positionable relative to the second piston rod by means of a thread, so that by rotating the switchover element, on the one hand, the switchover position is changable, and, on the other hand, upon termination of the rotational movement, the switchover element is automatically in a switchover position fixed in the longitudinal direction of the piston rod.

In order to prevent the switchover element from rotating and leaving its adjusted switchover position, as a result of vibrations of similar influences, it is preferably provided that the switchover element is constructed from two partial rings, which are clampable against one another by being rotated relatively to one another. However, any other manner of arresting the rotational movement of the switchover element is also possible in such an embodiment.

Moreover, the aforementioned object may also be achieved by a clamping force generator operating a clamping arrangement and having at least one first cylinder chamber, which is enclosed by a first cylinder housing and a first piston and which in order to generate a clamping force for the clamping arrangement, is subjected to a pressurized medium, wherein according to the invention a second cylinder chamber enclosed by a second cylinder housing and a second piston is provided, for operation of the clamping arrangement, always both cylinder chambers are subjected to a pressurized medium, and wherein in order to generate different clamping forces, said clamping force generator is switchable over from a first working mode, in which the first piston operates the clamping arrangement, into a second working mode, in which the second piston operates the clamping arrangement.

Further advantageous configurations of such a clamping force generator have individual or several of the above-described features, and therefore reference is made to the above statements in their entirety.

Further features and advantages of the solution according to the invention are the subject of the following description and of the drawing representing an embodiment.

DETAILED DESCRIPTION OF THE INVENTION

Figure 1:
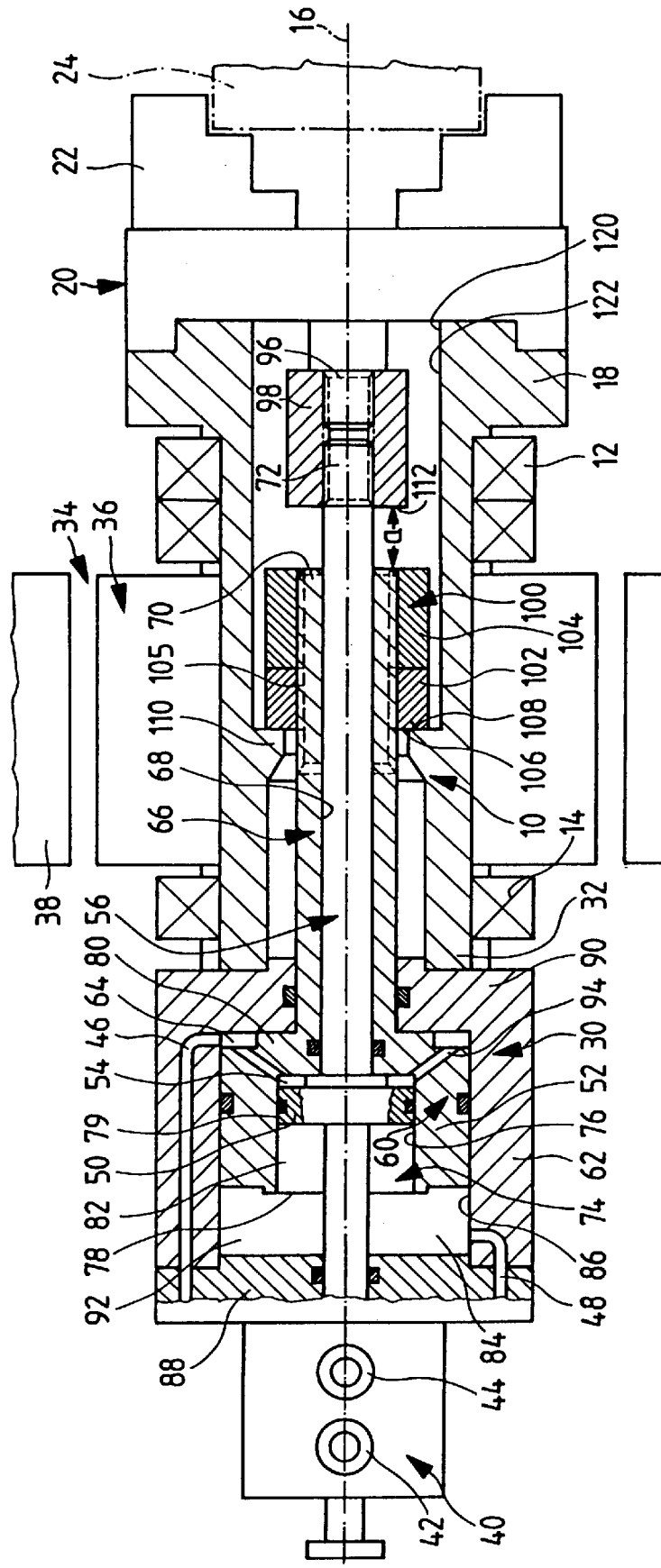
FIG. 1: a partial longitudinal section through a first embodiment of a work spindle according to the invention in a first working mode.
Figure 2:
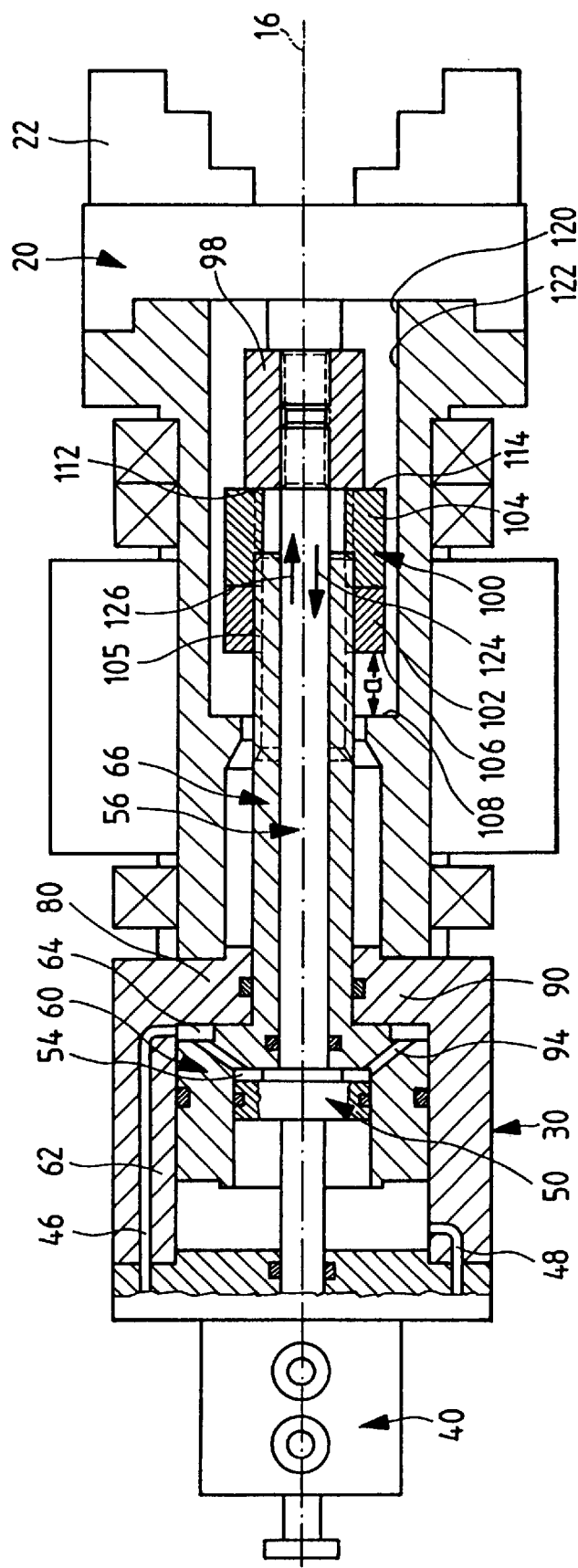
FIG. 2: a longitudinal section of the work spindle in FIG. 1 in a second working mode.

A first embodiment of a work spindle or operating spindle according to the invention, shown in FIGS. 1 and 2, comprises a spindle guard tube, given the overall reference 10, which is mounted to allow rotation around a spindle axis 16 in spindle bearings 12 and 14 arranged at a distance from one another. At a first end 18, the spindle guard tube 10 supports a clamping arrangement, given the overall reference 20, whereby the clamping arrangement 20 may be a clamping arrangement both for a work piece and for a tool. In the shown embodiment, the clamping arrangement is constructed as a clamping arrangement for a work piece and has clamping jaws 22 which may be moved radially towards one another in the direction of the spindle axis 16 to clamp a work piece 24.

For operation of the clamping arrangement 20, a clamping force generator, given the overall reference 30, is provided which is preferably held on a second end 32 opposite the first end 18.

To drive the work spindle, a motor given the overall reference 34 is provided which comprises a rotor 36 seated on the spindle guard tube 10 between the spindle bearings 12 and 14 in a manner fixed against rotation and a fixedly arranged stator 38. However, it is equally possible to drive the spindle guard tube 10 via a motor seated next to the spindle guard tube by means of a belt.

Since the clamping force generator 30 is firmly held on the spindle guard tube 10 and is thus rotated with it, a medium supply means 40 rotating therewith, which constitutes a connection between two stationary connections 42 and 44 as well as two medium lines 46 and 48 rotating therewith, is provided on a side of the clamping force generator 30 facing away from the second end 32 of the spindle guard tube 10, for the supply of an operating medium, in particular a hydraulic medium.

The clamping force generator 30 comprises a first piston 50, which is arranged in a first cylinder housing 52, in which case the first cylinder housing 52 and the first piston 50 enclose a cylinder chamber 54 between them. Moreover, a first piston rod 56 extends from the first piston 50 coaxially to the spindle guard tube 10 in the direction of the clamping arrangement 20.

In the solution according to the invention, the first cylinder housing 52 is formed by a second piston, given the overall reference 60, which is in turn arranged in a second cylinder housing 62, whereby a second cylinder chamber 64 is enclosed between the second cylinder housing 62 and the second piston 60.

A second piston rod 66 is connected to the second piston 60, the former being preferably moulded onto the second piston 60 in one piece. The second piston rod 66 is constructed in the form of a tube, and has an inner conduit 68, in which the first piston rod 56 extends, whereby the inner conduit 68 on one side extends through as far as the first cylinder chamber 54, and thus through the second piston 60, and on the other side extends as far as a front end 70 of the second piston rod 66, so that the first piston rod 56 then projects therefrom at an end 72 facing the clamping arrangement 20.

In order to tightly seal the first cylinder chamber 54, the first piston rod 56 runs in the inner conduit 68 so as to be sealed in its longitudinal direction.

For guidance of the piston 50, the first cylinder housing 52 has a recess 74 comprising cylindrical faces 76, which run parallel to the spindle axis 16 and into which the first piston 50 is displaceably guided with its piston shell faces 79 parallel to the spindle axis 16. The recess 74 extends from an opening 78 of the second piston 60 as far as a piston head 80 thereof, and is divided by the first piston 50 into the first cylinder chamber 54 as well as a rear-side first cylinder chamber 82 accessible via the opening 78.

The second piston 60 arranged in the second cylinder housing 62 is also displaceably guided in the direction of the spindle axis 16 in a recess 84 with wall faces 86 parallel to the spindle axis 16, i.e. between a cylinder housing cover 88 and a cylinder housing base 90, whereby the second piston 60 separates the second cylinder chamber 64 from a rear-side second cylinder chamber 92. In this case, the rear-side first cylinder chamber merges into the rear-side second cylinder chamber 92 via the opening 78.

From the rotating medium supply means 40 arranged on the cylinder housing cover 88, the medium lines 46 and 48 pass through the wall of the second cylinder housing 62, medium line 46 feeding into the second cylinder chamber 64 and medium line 48 feeding into the rear-side second cylinder chamber 92. The rear-side first cylinder chamber 82 is also connected directly to the rear-side second cylinder chamber 92 via the opening 78, so that hydraulic medium may be supplied or discharged from both rear-side cylinder chambers 82 and 92 via the medium lines 48.

The first cylinder chamber 54 and the second cylinder chamber 64 are also connected to one another, i.e. through conduits 94 passing through the piston head 80 of the second piston which are provided with openings feeding both into the first cylinder chamber 54 and into the second cylinder chamber 64.

In the case of supply of medium under a specific pressure via the medium line 46, therefore, both the first cylinder chamber 54 and the second cylinder chamber 64 may be subjected to medium under the provided pressure simultaneously.

Depending on the size of the piston areas of the first piston 50 running perpendicular to the spindle axis 16 or the piston areas of the second piston 60 running perpendicular to the spindle axis 16, a different clamping force may now be generated in the clamping arrangement 20 in the solution according to the invention.

For this purpose, the first piston rod 56 is connected to an operating rod 96 of the clamping arrangement in the region of the end 72 projecting beyond the second piston rod 66 by means of a connecting element 98. The operating rod 96 and the end 72 are preferably provided with a thread, and the two are connected to one another by a bushing 98 which may be screwed onto the thread.

Moreover, a switchover element, given the overall reference 100, is provided which is constructed, for example, in the form of a threaded ring, preferably of a divided threaded ring with partial rings 102 and 104, which may be clamped against one another. In this case, the switchover element 100 in the form of a threaded ring is screwed onto an external thread 105 of the second piston rod 66, said external thread extending from the front end 70 of the second piston rod 66 in the direction of the second piston 60.

The switchover element 100 may be brought by rotation into various positions fixed relative to the second piston rod 66. As FIG. 1 shows, for example, the switchover element 100 in the form of a threaded ring is arranged in the first switchover position shown in FIG. 1 in such a way that the switchover element 100 abuts against an annular shoulder 108 of a supporting ring 110 moulded onto the spindle guard tube 10 at its face 106 facing the clamping force generator 30, whereby in the first switchover position of the switchover element 100 shown in FIG. 1, the second piston 60 abuts against the cylinder housing 90 at its piston head 80.

In this first switchover position, the clamping force generator 30 operates in a first working mode, whereby in the first working mode, as a result of the face 106 abutting against the annular shoulder 108, the second piston 60 is arranged to be immovable in second cylinder housing 62, and only the first piston 50 is movable. Therefore, when the second cylinder chamber 64 is subjected to pressure via the medium line 46, no movement of the second piston 60 occurs, instead the medium flows via the conduits 94 through the piston head 80 of the second piston 60 into the first cylinder chamber 54. The piston areas of the first piston 50 running perpendicular to the spindle axis 16 are thus subjected to the medium under the defined pressure and generate a force proportional to the size of the piston area of the first piston 50 in a clamping arrangement 124, which transfers the first piston rod 56 via the bushing 98 connected to both the end 72 and the operating rod 96 to the clamping arrangement 20. In this case, the bushing 98 may be moved in the direction of the front end 70 of the second piston rod 66 until an end face 112 of the bushing 98 comes into abutment against the front end 70 of the second piston rod 66. This possible path is indicated by a in FIG. 1.

In a second switchover position shown in FIG. 2, the switchover element 100 constructed in the form of a threaded ring projects beyond the front end 70 of the second piston rod 66, i.e. sufficiently for a face 114 thereof to abut against the end face 112 of the bushing 98.

In this second switchover position of the switchover element 100, the first piston 50 is moved so far in the direction of the piston head 80 of the second piston 60 that it abuts against this.

In the second switchover position of the switchover element 100, this is moved so far in the direction of the clamping arrangement 20 through rotation on the external thread 105 of the second piston rod that an interstice a, viewed in the direction of the spindle axis 16, is left between the face 106 of the switchover element and the annular shoulder 108 when the clamping force generator 30 is not being operated.

If, in the second switchover position of the switchover element 100, the second cylinder chamber 64 is subjected to the pressurized medium via the medium line 46, then the second piston 60 moves away from the cylinder housing base 90, driving the first piston 50 with it, in which case the first piston 50 and the second piston 60 are connected to one another by the switchover element 100 non-displaceably in the direction of the spindle axis 16. Moreover, the consequence of this non-displaceable connection of the first piston 50 and the second piston 60 is that the application of pressure on the first cylinder chamber 54 via the conduits 94 remains without effect, and therefore the force in clamping direction 124 generated in the second switchover position of the switchover element 100, and thus in the second working mode of the clamping force generator 30, is proportional to the size of the piston areas of the second piston 60 extending perpendicular to the spindle axis 16. This force is likewise transferred onto the operating rod 96 of the clamping arrangement 20 via the first piston rod 56 and the bushing 98.

If the medium is respectively supplied at the same pressure via the medium line 46, irrespective of the working mode, in order to operate the clamping arrangement 20, then, depending on the working mode, different forces are active on the operating rod 96 because of the different piston areas of the first piston 50 and the second piston 60, and therefore clamping of the work piece 24, for example, likewise occurs with different forces, although pressurized medium is supplied via the connection 42 and thus via the medium line 46, for example, and medium is discharged from the rear-side cylinder chambers 82 via the connection 44 and the medium line 48.

As shown in FIGS. 1 and 2, the two piston rods 56 and 66 are constructed according to the invention so that their front ends 72 and 70 lie close to the first end 18 of the spindle guard tube 10, which supports the clamping arrangement 20 so that when the clamping arrangement 20 is removed, the switchover element 100 is accessible via a face opening 120 and may be brought into the second switchover position from the first switchover position by rotation, whereby the partial rings 102 and 104 are clamped in each of the switchover positions by rotating them relative to one another in order to fix the switchover element 100 non-positively in the respective switchover position.

The previously described method of operation of the clamping force generator 30 preferably relates to cases in which, as shown in FIG. 1, the work piece 24 is clamped externally by pulling in a clamping direction 124.

However, internal clamping is also possible, whereby the clamping arrangement 20 must be operated in the reversed clamping direction 126.

For this purpose, the rear-side first and second cylinder chambers 82 and 92 are then subjected to pressure via the medium line 48, whereby, in the first working mode, the second piston 60 may be fixed relative to the spindle guard tube by the switchover element 100 in the described manner, while the first piston 50 is operating, and in the second working mode, the first piston 50 is fixed relative to the second piston 60 so that ultimately only the second piston 60 is working.

In particular in the second working mode, it is necessary that the switchover element 100 abuts with its supporting surface 114 against the supporting surface 112 of the bushing 98 so that the second piston 60 is in a position to act on the clamping arrangement 20 in the clamping direction 126 via the second piston rod 66.

In order to improve accessibility to the switchover element, extending from the face opening 120, the spindle guard tube is preferably provided with a radially widening recess 122, which extends in the direction of the clamping force generator 30 and which extends so far into the spindle guard tube 10 that the switchover element 100 is readily accessible in both switchover positions, and therefore the two partial rings 102 and 104 may be clamped against one another in a simple manner and the entire switchover element 100 may be moved back and forth between the two switchover positions.

Figure 3:
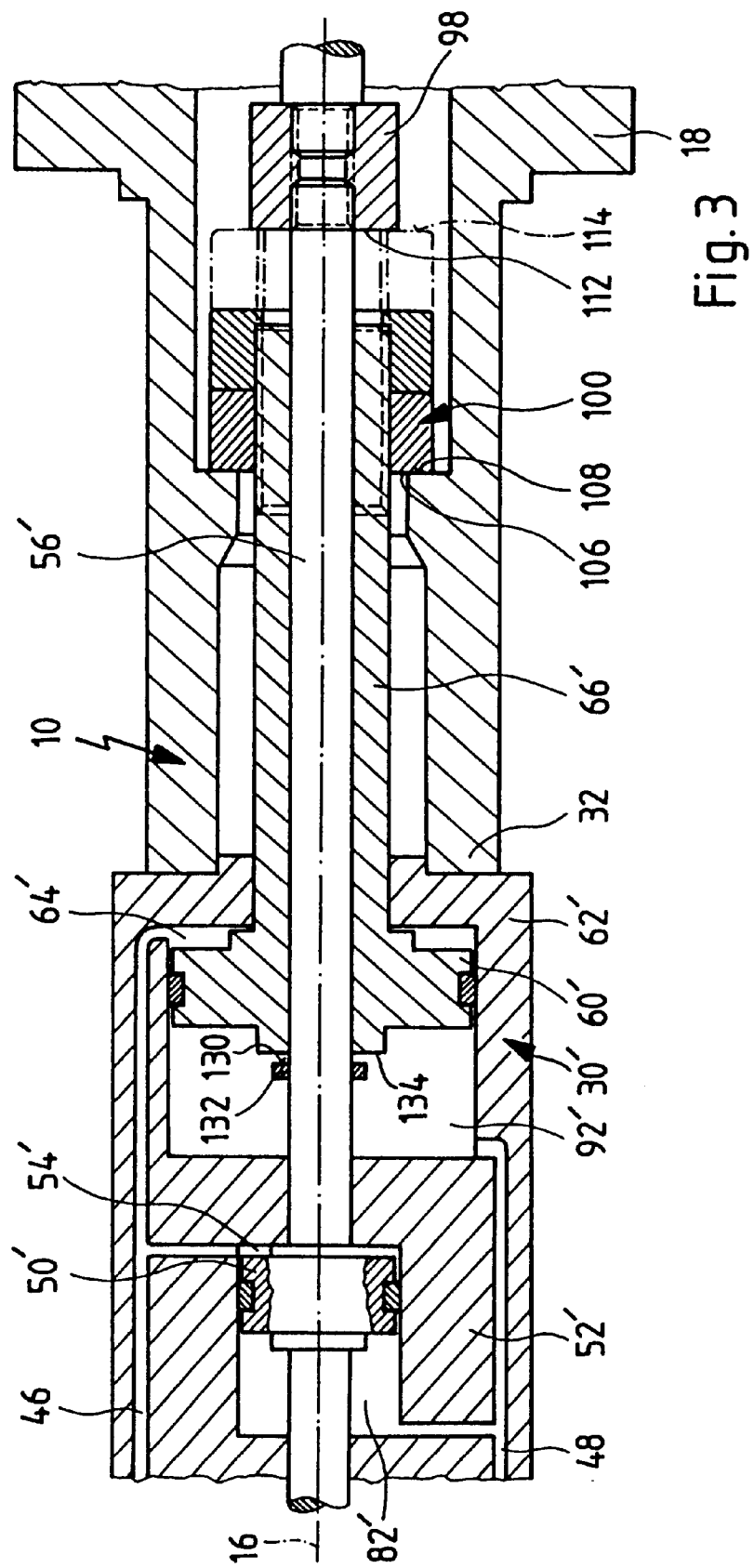
FIG. 3: a partial longitudinal section similar to FIG. 1 through a second embodiment of a work spindle according to the invention.

In a second embodiment, shown in FIG. 3, the clamping force generator 30' is constructed so that both the first cylinder housing 52' and the second cylinder housing 62' are arranged in one housing block, i.e. one after the other.

The cylinder housing 62', in which the piston 60' is arranged, the second piston rod 66' of which extends in the direction of the clamping arrangement 20, lies facing the end 32 of the spindle guard tube 10.

On the side of the second cylinder housing 62' facing away from the end 32, the first cylinder housing 52' is arranged in the housing block of the clamping force generator 30', and the first piston 50' therein, whereby the first piston rod 56' connected thereto extends through the second cylinder housing 62' and also through the second piston 60' and the second piston rod 66' in the direction of the clamping arrangement 20, in the same manner as that described in conjunction with the first embodiment.

In the same way as in the first embodiment, both cylinder chambers 54' and 64' are constantly connected directly to the medium line 46, and the rear-side cylinders 82' and 92' to the medium line 48.

Moreover, the first piston rod 56' passing through the second piston 60' is provided with a stop ring 132 having an abutment shoulder 130, against which the second piston 60' comes into abutment with a stop surface 134 facing away from the second piston rod 66' when the second piston is not fixed on the spindle guard tube 10 by the switchover element 100.

The second embodiment differs from the first embodiment with respect to its method of operation in that when the medium line 46 is subjected to pressure from the pressurized hydraulic medium, the two pistons 50' and 60' cooperate, since the second piston 60' comes into abutment against the abutment shoulder 130 with the stop surface 134, and thus likewise acts on the clamping arrangement 20 via the first piston rod 56'.

Serving as the active surface is the area of the first piston 50' facing the first cylinder chamber 54', plus the piston area of the second piston 60' facing the second cylinder chamber 64', when the two cylinder chambers 54' and 64' are subjected to pressurized medium via the medium line 46.

In contrast to the first embodiment, in this case, the total surface area of both pistons 50' and 60' is active in the second working mode, the switchover element 100 in this case standing in the position shown in broken lines in FIG. 3.

If the switchover element 100 is located in the position shown in FIG. 3, then the method of operation corresponds to the first working mode of the first embodiment, since the second piston 60' is fixed relative to the spindle guard tube via the switchover element, so that only the first piston 50' acts on the clamping arrangement 20 via the first piston rod 56', and thus only its piston area facing the first cylinder chamber 54' can be active.

In the same way as in the first embodiment, however, the effect on the clamping arrangement 20 may also be reversed, for example, to the internal clamping of parts, namely if the rear-side cylinder chambers 82' and 92' are simultaneously subjected to pressure via the medium line 48.

In this case, in the first working mode, in which the second piston 60' is fixed by the switchover element 100, likewise only the first piston 50' is active, while in the other second working mode, the piston areas of the pistons 50' and 60' facing the rear-side cylinder chambers 82' and 92' are active together, whereby in this case the first piston rod 56' acts directly on the clamping arrangement, while the second piston rod 66' acts on the face 112 of the bushing 98 via the switchover element 100, in particular its face 114, located in the position shown in broken lines.

What is claimed is:

1. A work spindle for a machine tool, comprising:
   a spindle guard tube rotatably mounted in spindle bearings,
   the spindle guard tube being drivable by a motor,
   a clamping arrangement disposed at an end of the spindle guard tube,
   a clamping force generator, which is arranged on the spindle guard tube and operates the clamping arrangement, and which has at least one first cylinder chamber enclosed by a first cylinder housing and a first piston, which in order to generate a clamping force in the clamping arrangement, is subjected to a pressurized medium, and
   a connection between the clamping force generator and the clamping arrangement, wherein:

the clamping force generator has a second cylinder chamber enclosed by a second cylinder housing and a second piston;

for operation of the clamping arrangement, always both cylinder chambers are subjected to a pressurized medium; and in order to generate different clamping forces, the clamping force generator is switchable over from a first working mode, in which at least the first piston operates the clamping arrangement, into a second working mode, in which at least the second piston operates the clamping arrangement.

2. A work spindle according to claim 1, wherein:

only the first piston is active in the first working mode, and both of the first and second pistons are active in the second working mode.

3. A work spindle according to claim 1, wherein:

only the first piston is active in the first working mode, and only the second piston is active in the second working mode.

4. A work spindle according to claim 2, wherein:

in the first working mode, the second piston is fixable relative to the second cylinder housing.

5. A work spindle according to claim 3, wherein:

in the second working mode, the first piston is fixable relative to the first cylinder housing.

6. A work spindle according to claim 1, wherein:

a piston area of one of the first and second pistons is larger than a piston area of the other of the first and second pistons.

7. A work spindle according to claim 2, wherein:

a switchover occurs between the first and the second working mode by changing a fixture of the pistons.

8. A work spindle according to claim 7, wherein;

a switchover element is provided for the switchover between the first and second working mode.

9. A work spindle according to claim 8, wherein:

the switchover element is manually operable.

10. A work spindle according to claim 8, wherein:

the switchover element is arranged to face the clamping arrangement.

11. A work spindle according to claim 10, wherein:

the switchover element is arranged in the spindle guard tube so as to be accessible with respect to the clamping arrangement.

12. A work spindle according to claim 8, wherein:

the switchover element is active at the connection between the clamping force generator and the clamping arrangement [(20)].

13. A work spindle according to claim 1, wherein:

the first cylinder housing of the first piston is formed by the second piston.

14. A work spindle according to claim 13, wherein:

the first cylinder chamber of the first piston is connected to the second cylinder chamber via a conduit in the second piston.

15. A work spindle according to claim 1, wherein:

each of said first and second pistons has a respective rear-side cylinder chamber;

and that the respective rear-side cylinder chambers are connected to one another when the clamping arrangement is operated.

16. A work spindle according to claim 15, wherein:

the respective rear-side cylinder chambers merge into one another.

17. A work spindle according to claim 1, wherein:

the connection between the clamping force generator and the clamping arrangement comprises a first piston rod of the first piston and a second piston rod of the second piston.

18. A work spindle according to claim 17, wherein:

the first piston rod runs coaxially to the second piston rod, which is constructed in the form of a tube.

19. A work spindle according to claim 13, wherein:

the spindle guard tube supports the second cylinder housing of the second piston.

20. A work spindle according to claim 19, wherein:

the spindle guard tube supports the second cylinder housing of the second piston at an end of the spindle guard tube that is opposite the clamping arrangement.

21. A work spindle according to claim 17, wherein:

in the first working mode, the second piston rod is fixable relative to the spindle guard tube by means of the switchover element.

22. A work spindle according to claim 17, wherein:

in the second working mode, the first piston rod is fixable relative to the second piston rod by means of the switchover element.

23. A work spindle according to claim 21, wherein:

the switchover element is arranged on the second piston rod and is movable into various switchover positions fixed relative to the second piston rod.

24. A work spindle according to claim 23, wherein:

in a first switchover position, the switchover element abuts against a shoulder fixedly arranged in relation to the spindle guard tube.

25. A work spindle according to claim 23, wherein:

in a second switchover position, the switchover element abuts against a shoulder fixedly connected to the first piston rod.

* * * * *